(12) United States Patent
Lee et al.

(10) Patent No.: US 10,708,121 B2
(45) Date of Patent: Jul. 7, 2020

(54) INTELLIGENT NETWORK (71) Applicant: Comcast Cable Communications, LLC, Philadelphia, PA (US)

(72) Inventors: Yiu L. Lee, Philadelphia, PA (US); Ivan Ong, Malvern, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

(21) Appl. No.: 13/669,039

(22) Filed: Nov. 5, 2012

(65) Prior Publication Data

US 2014/0126356 A1 May 8, 2014

(51) Int. Cl.
H04L 12/24 (2006.01)

(52) U.S. Cl.
CPC .............................. H04L 41/0663 (2013.01)

(58) Field of Classification Search
CPC ..... H04L 45/28; H04L 45/22; H04L 41/0654; H04L 41/0663; H04L 69/40
USPC ......................................................... 370/228
See application file for complete search history.

(56) References Cited

U.S. PATENT DOCUMENTS

| | | | | |
|---|---|---|---|---|
| 6,531,953 B1* | 3/2003 | Matsuo | ............... | H04L 12/5601 340/2.1 |
| 6,965,775 B2* | 11/2005 | Antoniou | ................ | H04L 45/22 370/216 |
| 7,007,189 B2* | 2/2006 | Lee et al. | ....................... | 714/4.5 |
| 7,760,738 B1* | 7/2010 | Chamas et al. | .......... | 370/395.21 |
| 8,285,244 B2* | 10/2012 | Girard | .................... | H04M 11/04 379/37 |
| 2002/0131368 A1* | 9/2002 | Raftelis | ................... | H04L 41/08 370/241 |
| 2003/0076840 A1* | 4/2003 | Rajagopal | ........... | H04L 12/2602 370/395.21 |
| 2006/0146717 A1* | 7/2006 | Conner | ................. | H04L 45/123 370/238 |
| 2006/0271986 A1* | 11/2006 | Vogel | ..................... | H04N 7/102 725/111 |
| 2007/0008891 A1* | 1/2007 | Kline | .................. | H04L 12/2803 370/238 |
| 2007/0121593 A1* | 5/2007 | Vance | .................... | H04M 11/04 370/352 |
| 2007/0268821 A1* | 11/2007 | Levit et al. | ................... | 370/223 |
| 2008/0117836 A1* | 5/2008 | Savoor | ................ | H04L 41/0896 370/254 |
| 2008/0151834 A1* | 6/2008 | Natarajan | ............. | H04L 45/125 370/331 |
| 2008/0198811 A1* | 8/2008 | Deshpande | ........... | H04W 48/16 370/332 |
| 2009/0147690 A1* | 6/2009 | King | ...................... | H04L 45/22 370/245 |
| 2009/0213730 A1* | 8/2009 | Zeng | ..................... | H04W 24/04 370/217 |

(Continued)

Primary Examiner — Kodzovi Acolatse
Assistant Examiner — Abdeltif Ajid
(74) Attorney, Agent, or Firm — Ballard Spahr LLP (57) ABSTRACT

Systems and methods for providing services are disclosed. One aspect comprises determining a plurality of services to be provided over a first communication path to a destination, determining a select service of the plurality of services to be provided over a failover path to the destination, detecting a failure of the first communication path, and routing the select service over the failover path in response to the failure of the first communication path.

20 Claims, 7 Drawing Sheets

(56) References Cited

U.S. PATENT DOCUMENTS

| | | | |
|---|---|---|---|
| 2011/0292813 A1* | 12/2011 | Dunbar et al. | 370/244 |
| 2014/0003408 A1* | 1/2014 | Chhabra | H04W 48/16 |
| | | | 370/338 |
| 2014/0010073 A1* | 1/2014 | Shah et al. | 370/228 |
| 2014/0086042 A1* | 3/2014 | Van Gruenen | H04L 45/22 |
| | | | 370/221 |

* cited by examiner

INTELLIGENT NETWORK

BACKGROUND

Currently, services such as home security monitoring, Internet connectivity, telephone, content delivery, emergency contact service, voice over Internet protocol (VoIP), and the like are provided to users over various communication networks. As an example, certain communications networks have primary communication paths and redundant or secondary communication paths. In certain circumstances, the redundant or secondary communication path(s) can be used as failover paths in situations where the primary communication path is not available. However, current network failover provisions do not provide a sufficient means to selectively manage services provided to users over a network, and have other shortcomings.

SUMMARY

It is to be understood that both the following general description and the following detailed description are exemplary and explanatory only and are not restrictive, as claimed. Provided are methods and systems for providing services. The methods and systems described herein, in one aspect, can selectively manage services provided over one or more communication paths.

In an aspect, a mesh network can be configured to define a redundant network path to support select services in the event of a communication path failure, communication device failure, and/or threat. As an example, threats can comprise one or more of a disabled communication link, denial-of-service (DoS) attack, distributed denial-of-service (DDoS) attack, and the like. As a further example, select services can comprise one or more of emergency communications, home security communications, streaming content, VoIP, and the like.

In an aspect, a plurality of dual band wireless access points can be disposed in various locations. As an example, the wireless access points can be configured with a first service set identifier (SSID), associated with a user network or private network, to function as a local network for a particular user or users. As a further example, the wireless access points can be configured with a second SSID, associated with a public/community network or a hidden network, to function as a redundant network for connected devices. In an aspect, when a primary communication path fails, is interrupted, or is otherwise unavailable, one or more of the wireless access points within proximity of another wireless access point can switch (e.g., failover) to the redundant network. Accordingly, the wireless access points operating under the second SSID can facilitate a backhaul or failover provision to ensure service continuity for the connected users and communication devices. As an example, if telephone lines are interrupted, the redundant network can be leveraged to allow connected users to make emergency calls. As a further example, when hardwire feeds are interrupted in a home, the redundant network can facilitate remote monitoring for home security and the like.

In an aspect, since multiple access points and/or communication paths in the same region may fail simultaneously, the redundant network can be configured as an optimal network. As an example, one or more access points can use a capacity matrix and can exchange capacity information to determine an optimized and/or a preferred communication path. As another example, the capacity matrix can be application specific and can comprise information and parameters, such as maximum allowed bandwidth and particular service filters and/or pass-throughs. As a further example, the capacity matrix can be configured to intelligently load-balance the redundant network load based on services provisions and resource availability.

In an aspect, methods can comprise determining a plurality of services to be provided over a first communication path to a destination. A select service of the plurality of services can also be determined. As an example, the select service can be provided over a failover path to the destination. As a further example, the failover path can be defined over the redundant network. A failure of the first communication path can be detected and the select service can be routed over the failover path in response to the failure of the first communication path.

In another aspect, the methods can comprise determining a first communication path between a first node and a second node. As an example, one or more services are provided over the first communication path. A second communication path can be determined between the first node and the second node. A failure of the first communication path can be detected. A select service of the one or more services can be determined. The select service can be routed over the second communication path.

In a further aspect, the systems can comprise a plurality of nodes. A first path element can comprise information relating to a first communication path comprising a first one of the plurality of nodes. The first communication path can be configured to transmit one or more services to a destination. A second path element can comprise information relating to a second communication path comprising a second one of the plurality of nodes. The second communication path can be configured to transmit the one or more services to the destination. As an example, a failover element can be configured to detect a failure of the first communication path, determine a select service of the one or more service to be transmitted over the second communication path, and route the select service over the second communication path if the first communication path fails.

Additional advantages will be set forth in part in the description which follows or may be learned by practice. The advantages will be realized and attained by means of the elements and combinations particularly pointed out in the appended claims.

BRIEF DESCRIPTION OF THE DRAWINGS

The accompanying drawings, which are incorporated in and constitute a part of this specification, illustrate embodiments and together with the description, serve to explain the principles of the methods and systems.

DETAILED DESCRIPTION

Before the present methods and systems are disclosed and described, it is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there area variety of additional steps that can be performed it is understood that each of these additional steps can be performed with any specific embodiment or combination of embodiments of the disclosed methods.

The present methods and systems may be understood more readily by reference to the following detailed description of preferred embodiments and the examples included therein and to the Figures and their previous and following description.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

Figure 1A:
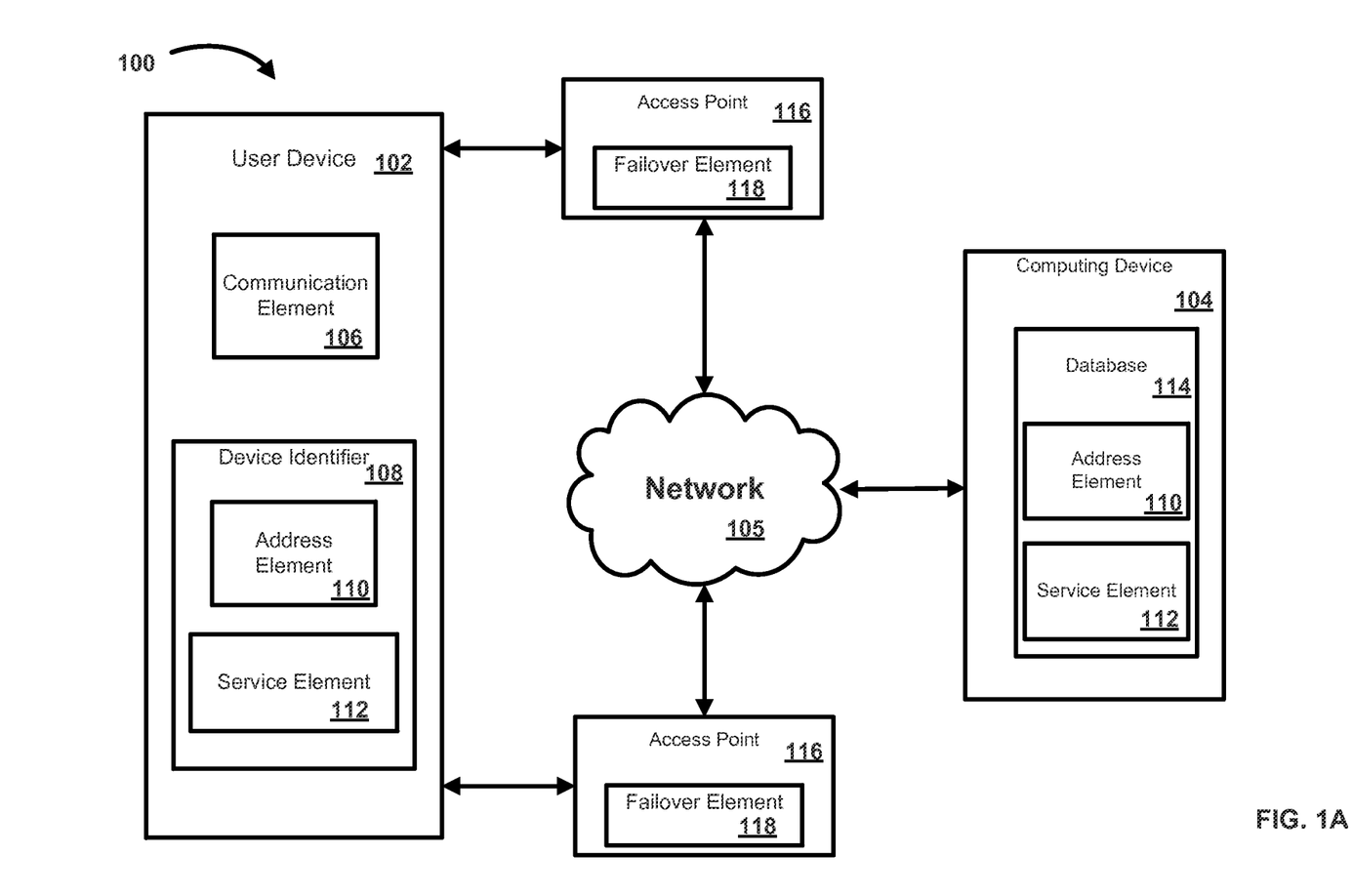
FIG. 1A is a block diagram of an exemplary system and network.

As described in greater detail below, in one aspect of the disclosure, a system can be configured to provide services, such as remediation service, to a user device. FIG. 1A illustrates various aspects of an exemplary network in which the present methods and systems can operate. The present disclosure is relevant to systems and methods for providing services to a user device, for example. Those skilled in the art will appreciate that present methods may be used in various types of networks and systems that employ both digital and analog equipment. The system is described as comprised of elements. An element can be software, hardware, or a combination of software and hardware. One skilled in the art will appreciate that provided herein is a functional description and that the respective functions can be performed by software, hardware, or a combination of software and hardware.

The network 100 can comprise a user device 102 in communication with a computing device 104 such as a server, for example. The computing device 104 can be disposed locally or remotely relative to the user device 102. As an example, the user device 102 and the computing device 104 can be in communication via a private and/or public network 105 such as the Internet. Any form of communication links can be used such as wired and wireless telecommunication channels, for example.

In an aspect, the user device 102 can be an electronic device such as a computer, a smartphone, a laptop, a tablet, a set top box, a display device, or other device capable of communicating with the computing device 104. As an example, the user device 102 can comprise a communication element 106 for providing an interface to a user to interact with the user device 102 and/or the computing device 104. The communication element 106 can be any interface for presenting information to the user and receiving user feedback such as a web browser (e.g., Internet Explorer, Firefox, Google Chrome, Safari, or the like). Other software, hardware, and/or interfaces can be used to provide communication between the user and one or more of the user device 102 and the computing device 104. As an example, the communication element 106 can request or query various files from a local source and/or a remote source. As a further example, the communication element 106 can transmit data to a local or remote device such as the computing device 104.

In an aspect, the user device 102 can be associated with a user identifier or device identifier 108. As an example, the device identifier 108 can be any identifier, token, character, string, or the like, for differentiating one user or user device (e.g., user device 102) from another user or user device. In a further aspect, the device identifier 108 can identify a user or user device as belonging to a particular class of users or user devices. As a further example, the device identifier 108 can comprise information relating to the user device such as a manufacturer, a model or type of device, a service provider associated with the user device 102, a state of the user device 102, a locator, and/or a label or classifier. Other information can be represented by the device identifier 108.

In an aspect, the device identifier 108 can comprise an address element 110 and a service element 112. In an aspect, the address element 110 can be an internet protocol address, a network address, an Internet address, or the like. As an example, the address element 110 can be relied upon to establish a communication session between the user device 102 and the computing device 104 or other devices and/or networks. As a further example, the address element 110 can be used as an identifier or locator of the user device 102.

In an aspect, the service element 112 can comprise an identification of a service provider associated with the user device 102 and/or with the class of user device 102. As an example, the service element 112 can comprise information relating to or provided by a communication service provider that is providing or enabling communication services to the user device 102. As a further example, the service element 112 can comprise information relating to a preferred service provider for one or more particular services relating to the user device 102. In an aspect, the address element 110 can be used to identify or retrieve the service element 112, or vise versa. As a further example, one or more of the address element 110 and the service element 112 can be stored remotely from the user device 102 and retrieved by one or more devices such as the user device 102 and the computing device 104. Other information can be represented by the service element 112.

In an aspect, the computing device 104 can be a server for communicating with the user device 102. As an example, the computing device 104 can communicate with the user device 102 for providing services. In an aspect, the computing device 104 can allow the user device 102 to interact with remote resources such as data, devices, and files. As an example, the computing device can be configured as central location, a headend, or processing facility, which can receive content (e.g., data, input programming) from multiple sources. The computing device 104 can combine the content from the various sources and can distribute the content to user locations via a distribution system. The computing device 104 can be a service or content provider's device.

In an aspect, the computing device 104 can manage the communication between the user device 102 and a database 114 (which can be external and/or remote from computing device 104) for sending and receiving data therebetween. As an example, the database 114 can store a plurality of files, webpages, user identifiers or records, or other information. As a further example, the user device 102 can request and/or retrieve a file from the database 114. In an aspect, the database 114 can store information relating to the user device 102 such as the address element 110 and/or the service element 112. As an example, the computing device 104 can obtain the device identifier 108 from the user device 102 and retrieve information from the database 114 such as the address element 110 and/or the service elements 112. As a further example, the computing device 104 can obtain the address element 110 from the user device 102 and can retrieve the service element 112 from the database 114, or vice versa. Any information can be stored in and retrieved from the database 114. The database 114 can be disposed remotely from the computing device 104 and accessed via direct or indirect connection. The database 114 can be integrated with the computing system 104 or some other device or system.

In an aspect, one or more access points 116 can be in communication with network 105. As an example, one or more of the access points 116 can facilitate the connection of a device, such as user device 102, to the network 105. As a further example, one or more of the access points 116 can be configured as a wireless access point (WAP). In an aspect, one or more access points 116 can be configured to allow one or more wireless devices to connect to a wired and/or wireless network using Wi-Fi, Bluetooth or similar standard.

In an aspect, the access points 116 can be configured as a mesh network. As an example, the mesh network can be configured to provide one or more redundant network paths. As a further example, the mesh network can be configured to support one or more select services such as emergency communications, home security communications, VoIP, access to preferred or premium content, and the like, in the event of a communication device failure, communication path failure, or intended threat (e.g., communication link is intentionally disabled, denial-of-service (DoS) attack, distributed denial-of-service (DDoS) attack).

In an aspect, one or more access points 116 can comprise a dual band wireless access point. As an example, the access points 116 can be configured with a first service set identifier (SSID), associated with a user network or private network, to function as a local network for a particular user or users. As a further example, the access points 116 can be configured with a second SSID, associated with a public/community network or a hidden network, to function as a secondary network or redundant network for connected communication devices.

Figure 1B:
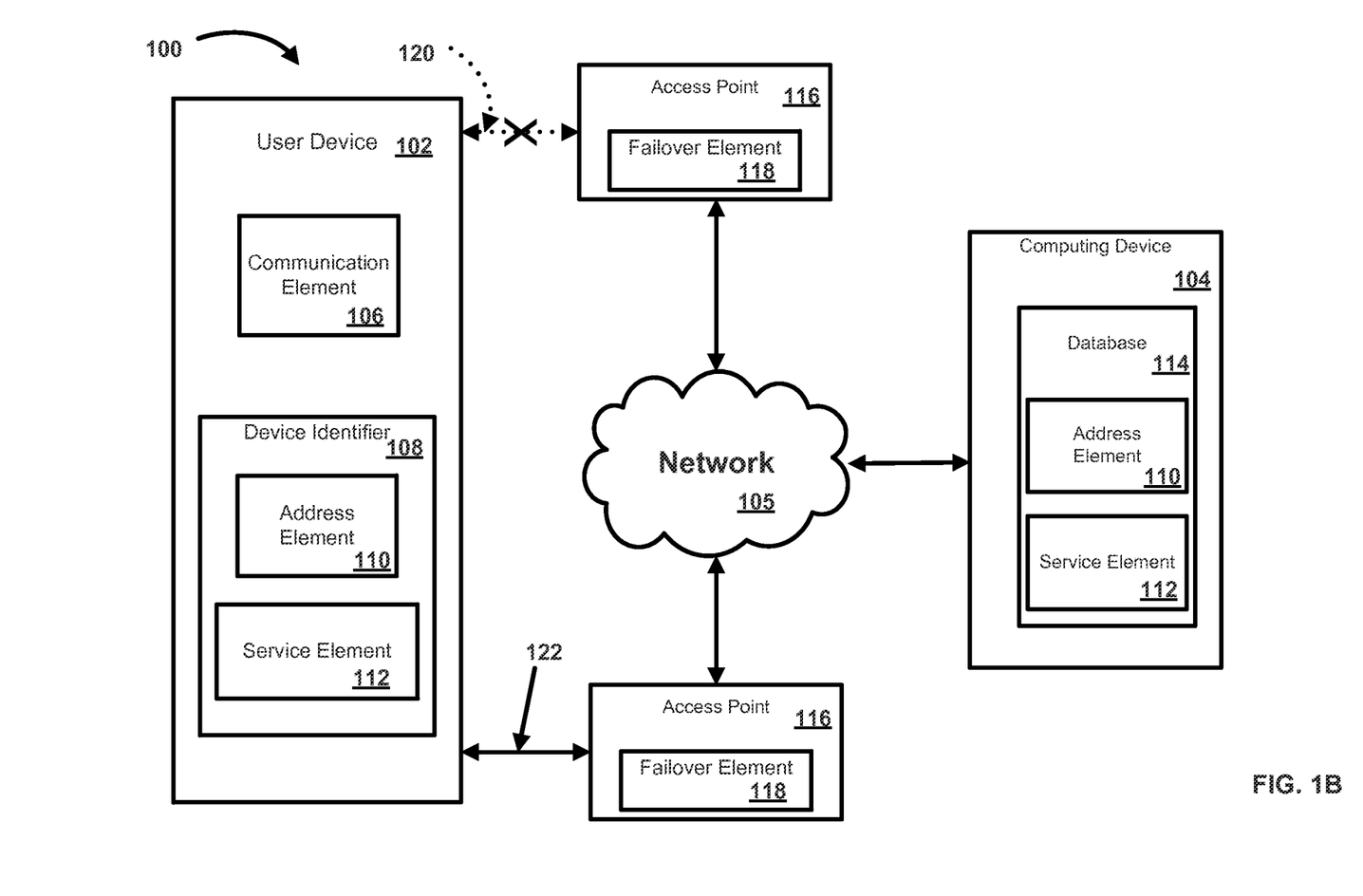
FIG. 1B is a block diagram of an exemplary system and network.

In an aspect, when a first communication path 120 or primary path fails, is interrupted, or is otherwise unavailable (e.g., due to congestion), one or more of the access points 116 within proximity of another access point 116 can switch (e.g., failover) to the redundant network path such as second path 122, as illustrated in FIG. 1B. As an example, one or more of the access points 116 can comprise a failover element 118. The failover element(s) 118 can comprise information relating to characteristics of a network, communication paths, and/or failover or redundant communication paths. In an aspect, the failover element 118 can detect an interrupt and/or failure of the first communication path 120 and can route network traffic and/or particular service to another path (e.g., second path 122 or secondary path). As an example, the failover element 118 can be configured to determine a select service of one or more services to be transmitted over the second path 122 or redundant communication path. In an aspect, the access points 116 (e.g., operating under the second SSID) can facilitate backhaul or failover provision to ensure service continuity for the connected users and communication devices. As an example, if telephone lines are interrupted, the redundant network can be leveraged to allow connected users to make emergency calls. As a further example, when hardwire feeds are interrupted in a home, the redundant network can facilitate remote monitoring for home security and the like.

Figure 2:
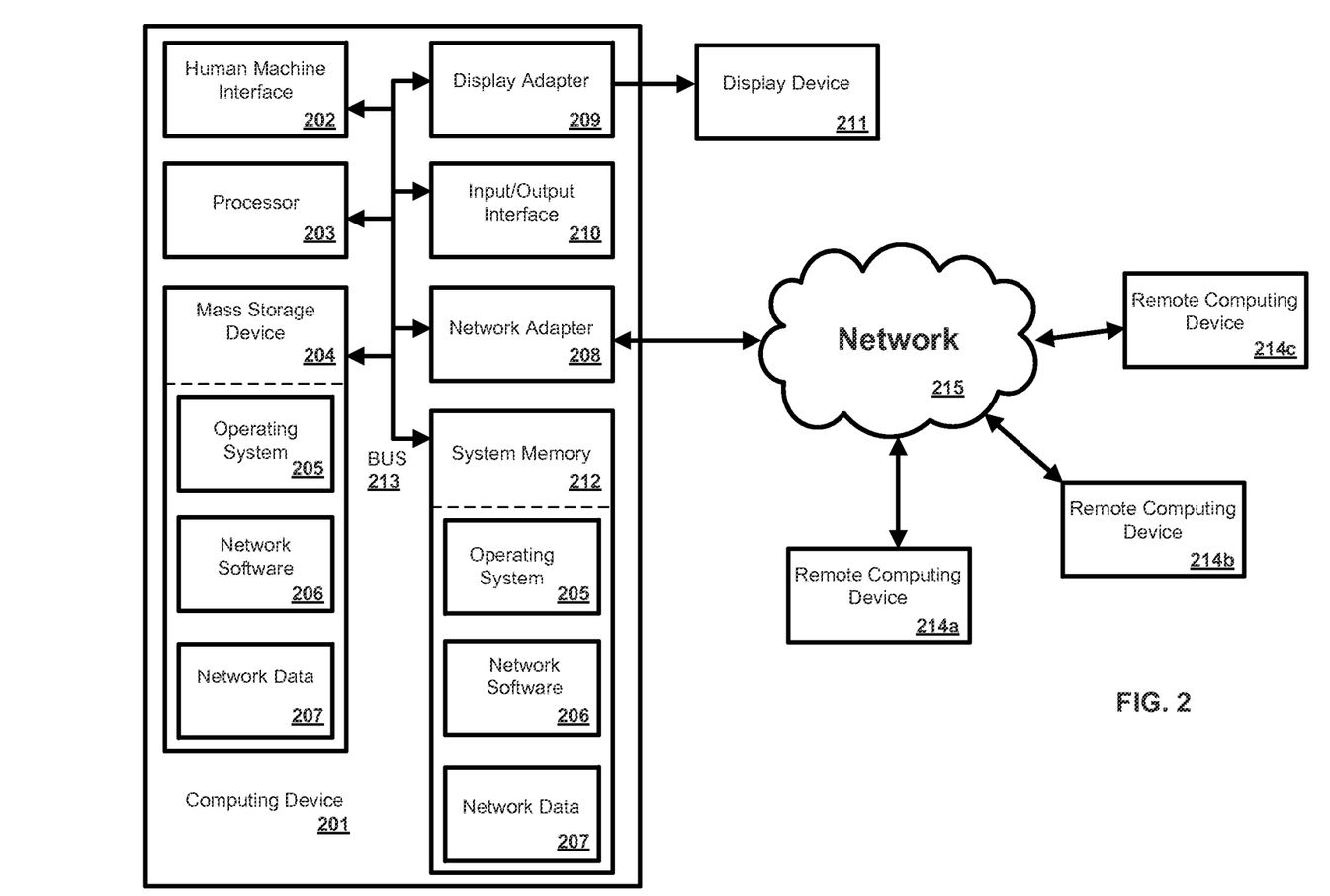
FIG. 2 is a block diagram of an exemplary computing device.

In an exemplary aspect, the methods and systems can be implemented on a computing system such as computing device 201 as illustrated in FIG. 2 and described below. By way of example, one or more of the user device 102 and the computing device 104 of FIGS. 1A-1B can be a computer as illustrated in FIG. 2. Similarly, the methods and systems disclosed can utilize one or more computers to perform one or more functions in one or more locations. FIG. 2 is a block diagram illustrating an exemplary operating environment for performing the disclosed methods. One skilled in the art will appreciate that this is a functional description and that the respective functions can be performed by software, hardware, or a combination of software and hardware. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The present methods and systems can be operational with numerous other general purpose or special purpose computing system environments or configurations. Examples of well known computing systems, environments, and/or configurations that can be suitable for use with the systems and methods comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

The processing of the disclosed methods and systems can be performed by software components. The disclosed systems and methods can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed methods can also be practiced in grid-based and distributed computing environments where tasks are performed by remote processing devices that are linked through a communications network. In a distributed computing environment, program modules can be located in both local and remote computer storage media including memory storage devices.

Further, one skilled in the art will appreciate that the systems and methods disclosed herein can be implemented via a general-purpose computing device in the form of a computing device 201. The components of the computing device 201 can comprise, but are not limited to, one or more processors or processing units 203, a system memory 212, and a system bus 213 that couples various system components including the processor 203 to the system memory 212. In the case of multiple processing units 203, the system can utilize parallel computing.

The system bus 213 represents one or more of several possible types of bus structures, including a memory bus or memory controller, a peripheral bus, an accelerated graphics port, and a processor or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The bus 213, and all buses specified in this description can also be implemented over a wired or wireless network connection and each of the subsystems, including the processor 203, a mass storage device 204, an operating system 205, network software 206, network data 207, a network adapter 208, system memory 212, an Input/Output Interface 210, a display adapter 209, a display device 211, and a human machine interface 202, can be contained within one or more remote computing devices 214a,b,c at physically separate locations, connected through buses of this form, in effect implementing a fully distributed system.

The computing device 201 typically comprises a variety of computer readable media. Exemplary readable media can be any available media that is accessible by the computing device 201 and comprises, for example and not meant to be limiting, both volatile and non-volatile media, removable and non-removable media. The system memory 212 comprises computer readable media in the form of volatile memory, such as random access memory (RAM), and/or non-volatile memory, such as read only memory (ROM). The system memory 212 typically contains data such as network data 207 and/or program modules such as operating system 205 and network software 206 that are immediately accessible to and/or are presently operated on by the processing unit 203.

In another aspect, the computing device 201 can also comprise other removable/non-removable, volatile/non-volatile computer storage media. By way of example, FIG. 2 illustrates a mass storage device 204 which can provide non-volatile storage of computer code, computer readable instructions, data structures, program modules, and other data for the computing device 201. For example and not meant to be limiting, a mass storage device 204 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 204, including by way of example, an operating system 205 and network software 206. Each of the operating system 205 and network software 206 (or some combination thereof) can comprise elements of the programming and the network software 206. Network data 207 can also be stored on the mass storage device 204. Network data 207 can be stored in any of one or more databases known in the art. Examples of such databases comprise, DB2®, Microsoft® Access, Microsoft® SQL Server, Oracle®, mySQL, PostgreSQL, and the like. The databases can be centralized or distributed across multiple systems.

In another aspect, the user can enter commands and information into the computing device 201 via an input device (not shown). Examples of such input devices comprise, but are not limited to, a keyboard, pointing device, mouse, microphone, joystick, scanner, tactile input devices such as gloves, and other body coverings, and the like These and other input devices can be connected to the processing unit 203 via a human machine interface 202 that is coupled to the system bus 213, but can be connected by other interface and bus structures, such as a parallel port, game port, an IEEE 1394 Port (also known as a Firewire port), a serial port, or a universal serial bus (USB).

In yet another aspect, a display device 211 can also be connected to the system bus 213 via an interface, such as a display adapter 209. It is contemplated that the computing device 201 can have more than one display adapter 209 and the computer 201 can have more than one display device 211. For example, a display device can be a monitor, an LCD (Liquid Crystal Display), or a projector. In addition to the display device 211, other output peripheral devices can comprise components such as speakers (not shown) and a printer (not shown) which can be connected to the computing device 201 via Input/Output Interface 210. Any step and/or result of the methods can be output in any form to an output device. Such output can be any form of visual representation, including, but not limited to, textual, graphical, animation, audio, tactile, and the like. The display 211 and computing device 201 can be part of one device, or separate devices.

The computing device 201 can operate in a networked environment using logical connections to one or more remote computing devices 214a,b,c. By way of example, a remote computing device can be a personal computer, portable computer, a smart phone, a server, a router, a network computer, a peer device or other common network node, and so on. Logical connections between the computing device 201 and a remote computing device 214a,b,c can be made via a network 215, such as a local area network (LAN) and a general wide area network (WAN). Such network connections can be through a network adapter 208. A network adapter 208 can be implemented in both wired and wireless environments. Such networking environments are conventional and commonplace in dwellings, offices, enterprise-wide computer networks, intranets, and the Internet.

For purposes of illustration, application programs and other executable program components such as the operating system 205 are illustrated herein as discrete blocks, although it is recognized that such programs and components reside at various times in different storage components of the computing device 201, and are executed by the data processor(s) of the computer. An implementation of software 206 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and "communications media." "Computer storage media" comprise volatile and non-volatile, removable and non-removable media implemented in any methods or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The methods and systems can employ Artificial Intelligence techniques such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. expert inference rules generated through a neural network or production rules from statistical learning).

Figure 3:
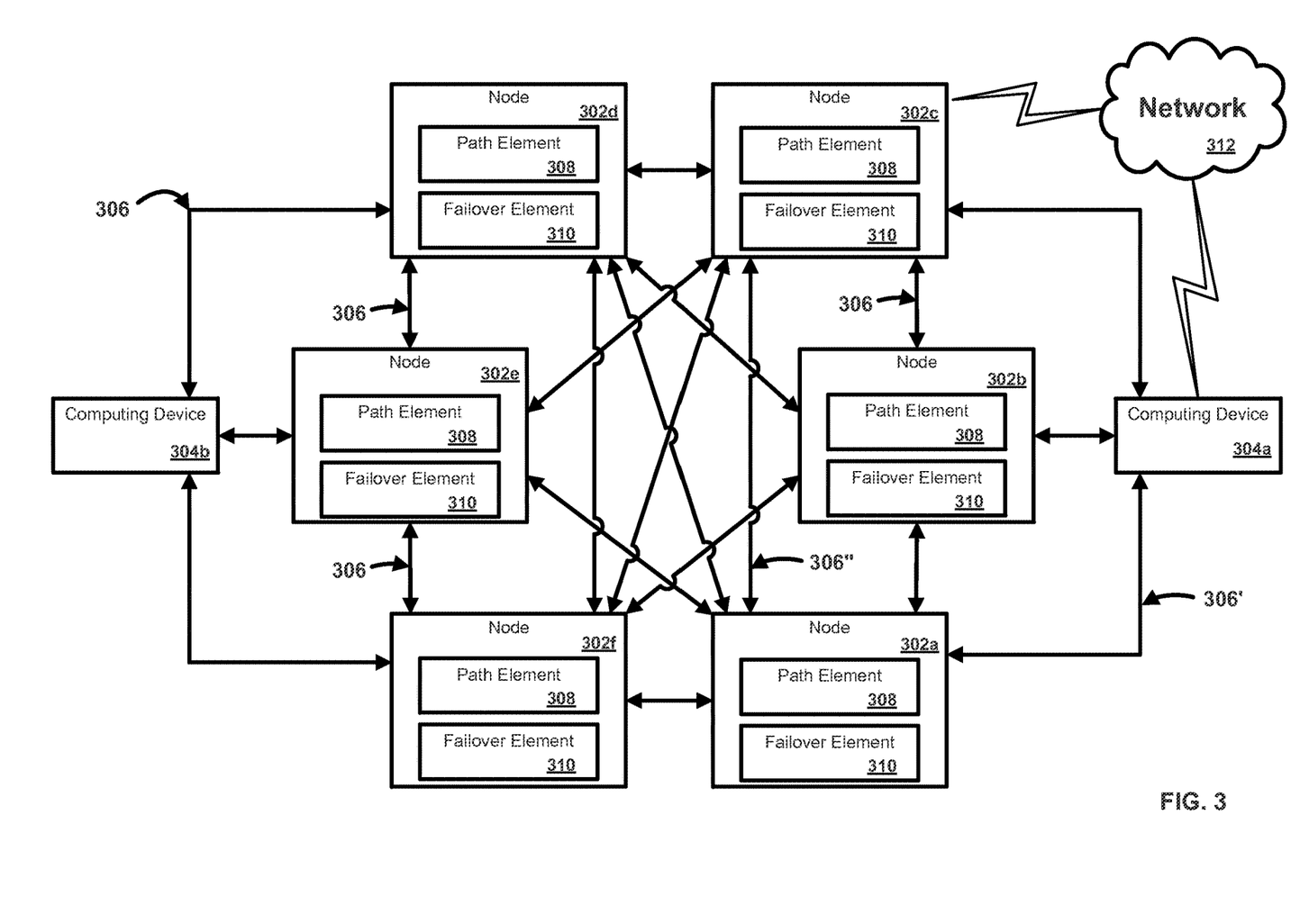
FIG. 3 is a diagram of an exemplary system and network.

FIG. 3 illustrates an exemplary system and network. In an aspect, plurality of nodes 302a, 302b, 302c, 302d, 302e, 302f can be in communication with one or more computing devices 304a, 304b. One or more of the nodes 302a, 302b, 302c, 302d, 302e, 302f can be a network access point, router, switch, or other communication device. One or more computing devices 304a, 304b can be a server, headend, terminal server, modem termination system, gateway or other network device, or a user device. As an example, one or more of the nodes 302a, 302b, 302c, 302d, 302e, 302f can be configured to communicate with another of the nodes 302a, 302b, 302c, 302d, 302e, 302f and/or one or more of the computing devices 304a, 304b via one or more communication paths 306. In an aspect, the one or more communication paths 306 can comprise one or more uninterrupted wired or wireless communication links, sequential links, pre-defined paths or links, and/or intervening nodes. Links can comprise a single point to point connection between two devices or access points. Paths can comprise one or more links. As an example, one or more of the communication paths 306 can comprise one or more of the nodes 302a, 302b, 302c, 302d, 302e, 302f. As a further example, one or more of the nodes 302a, 302b, 302c, 302d, 302e, 302f can be configured as a mesh network. In an aspect, one or more of the communication paths 306 can be configured to transmit one or more services.

In an aspect, one or more path elements 308 can comprise information relating to one or more of the communication paths 306. One or more path elements 308 can comprise information relating to path priority, cost of path, capacity, bandwidth, signal strength, latency, error rate, path usage, and the like. As an example, one or more of the path elements 308 can comprise information relating to a first communication path 306'. As a further example, one or more of the path elements 308 can comprise information relating to a second communication path 306".

In an aspect, one or more failover elements 310 can comprise information relating to characteristics of a network, communication paths, and/or failover or redundant communication paths. One or more failover elements 310 can comprise information relating to threshold of wireless signal, minimum available bandwidth, threshold of jitter and latency, error rate, ping count, and the like. As an example, a pre-defined number of ping counts can be transmitted/received at pre-determined intervals to determine a failover condition. As a further example, if a threshold of unacknowledged pings is surpassed after 180 seconds, then failover provisions can be executed. In an aspect, the failover element 310 can detect an interrupt and/or failure of a first communication path and can route network traffic and/or particular service to another path. As an example, the failover element 310 can be configured to determine a select service of one or more services to be transmitted over a failover or redundant communication path. In an aspect, the nodes 302a, 302b, 302c, 302d, 302e, 302f can facilitate a backhaul (e.g., connection to a backhaul network 312 such as cellular network) failover provision to ensure service continuity for the connected users and communication devices. As an example, if telephone lines are interrupted, the redundant network can be leveraged to allow connected users to make emergency calls. As a further example, when hardwire feeds are interrupted in a home, the redundant network can facilitate remote monitoring for home security and the like.

Figure 4:
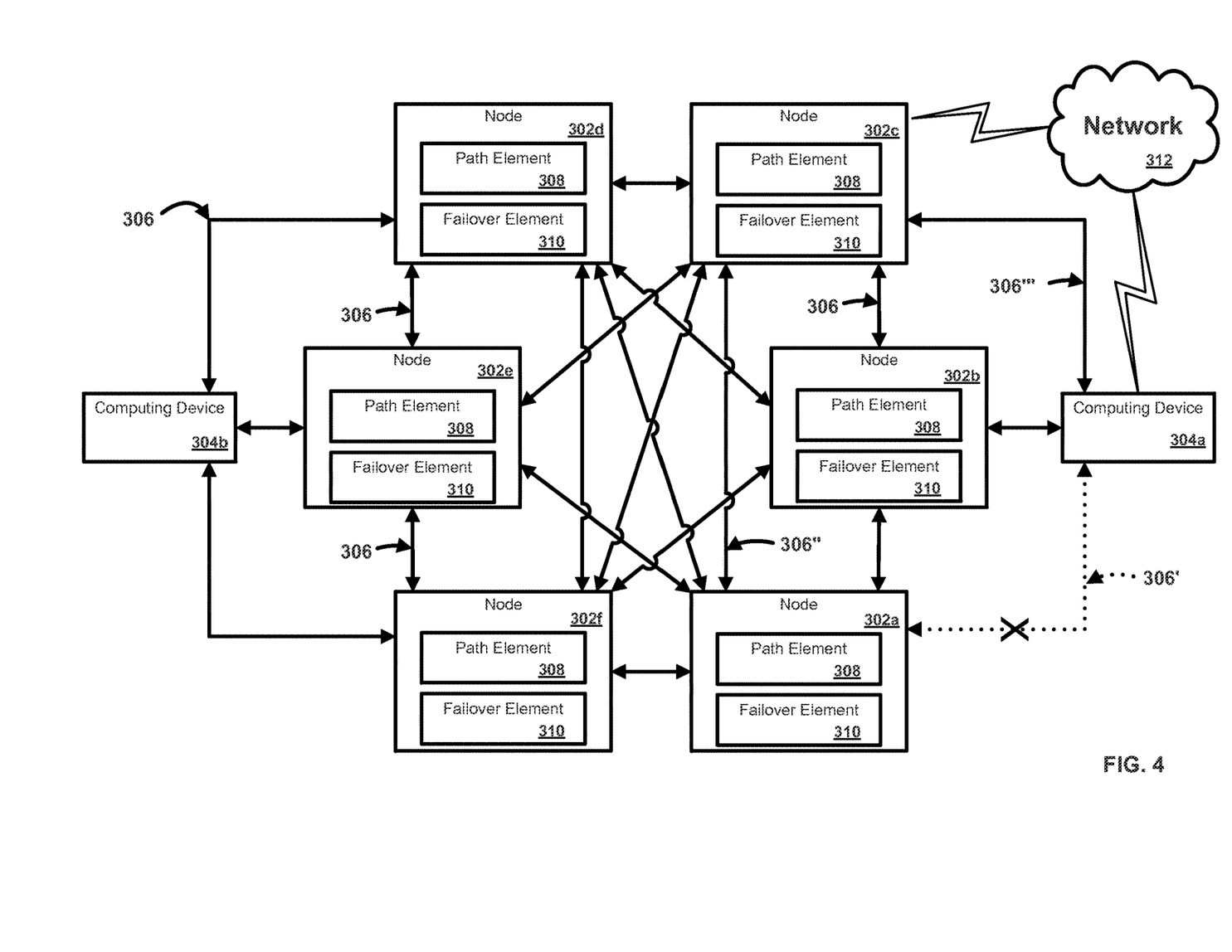
FIG. 4 is a diagram of an exemplary system and network.

As shown in FIG. 4, when the first communication path 306 fails or is unavailable, one or more services can be routed over an alternative path such as the second communication path 306". In an aspect, access points (e.g., nodes 302a, 302b, 302c, 302d, 302e, 302f) configured in a mesh network can communicate with each other to exchange network and service information. Network information can comprise available bandwidth, signal strength, network latency, and the like. Service information can comprise allowed or available services (e.g., VoIP, home security system, network, e.g., Internet, connectivity, etc.). Based on one or more of the network information and the service information, one or more nodes 302a, 302b, 302c, 302d, 302e, 302f can build a matrix and intelligently choose an optimal path for routing services when failover happens.

In an aspect, the first communication path 306' can be a hardline link between node 302a and computing device 304a. Upon failure of the first communication path 306' certain service that traversed the first communication path 306' can no longer be delivered to the node 302a via the failed first communication path 306'. Accordingly, an alternative route to deliver the services must be located. As illustrated in FIG. 4, a third communication path 306' can be a hardline communication path between node 302c and computing device 304a. The third communication path third communication path 306' can be configured to deliver services to node 302c similar to the services delivered over the first communication path 306' prior to failure. Since node 302c can receive the service(s) that were previously delivered to node 302a, the node 302a can determine a path to communicate with node 302c to continue to receive the desired service(s). As illustrated in FIG. 4, the second communication path 306" provides communication between node 302c and node 302a and can be configured as the failover communication path in the event the first communication path 306' is interrupted. However, other links and paths can be evaluated to provide an optimized path for delivering desired services to any node 302a, 302b, 302c, 302d, 302e, 302f.

In an aspect, since multiple access points or communication paths in the same region may fail simultaneously, the redundant network can be configured as an optimal network. As an example, one or more access points can use capacity matrix and exchange capacity information to determine an optimized and/or a preferred communication path (e.g., second communication path 306"). In an aspect, the capacity matrix can be application specific and can comprise information and parameters such as maximum allowed bandwidth and particular service filters and/or pass-throughs. As a further example, the capacity matrix can be configured to intelligently load-balance the redundant network load based on services provisions and resource availability. Other methods can be used to route data in a failover condition such as administrative manual failover. Other factors can be considered when determining routing procedures in a failover condition such as pre-configured service level agreement triggers and class of subscriber/user.

Figure 5:
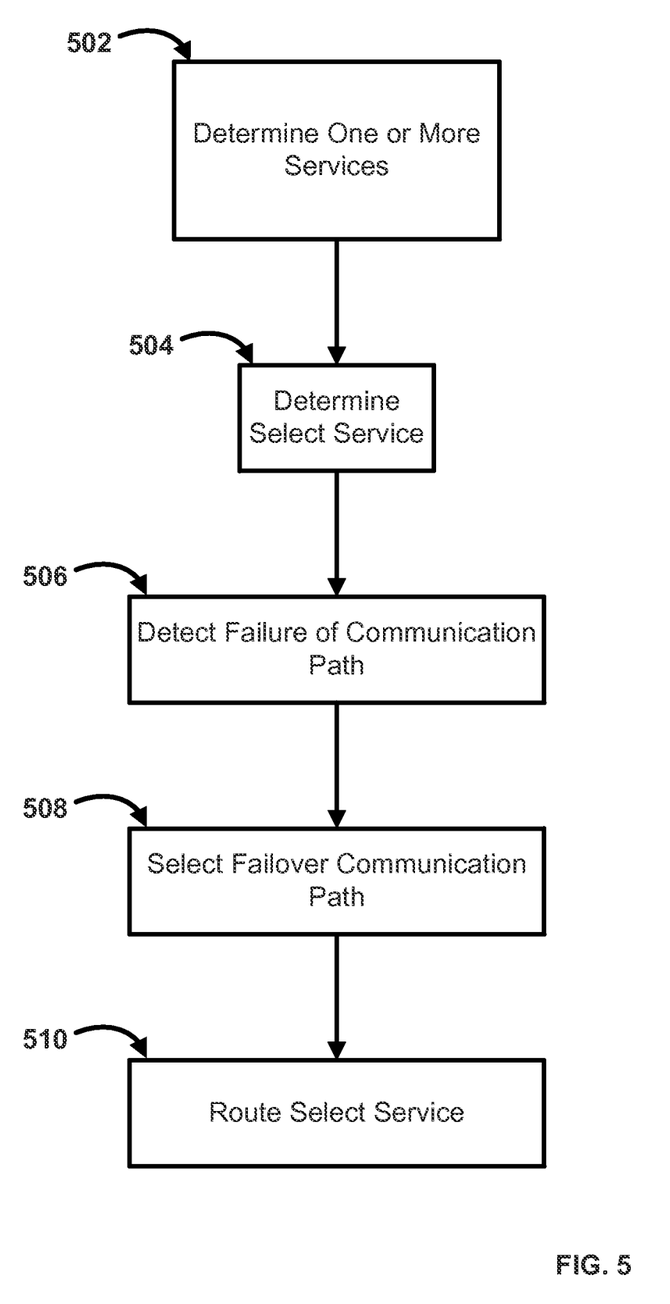
FIG. 5 is a flow chart of an exemplary method.

In an aspect, provided are methods for providing services to a user and/or user device. FIG. 5 illustrates an exemplary method for providing select services to a user and/or user device. The method illustrated in FIG. 5 will be discussed, for example only, in reference to FIGS. 1-4. In step 502, one or more available services can be determined. As an example, the services can comprise home security monitoring, network (e.g., Internet) connectivity, telephone, content access and/or delivery, and the like. As a further example, the services can be provided over a first communication path, such as the communication paths 306' (FIG. 3), to a particular destination. In an aspect, the first communication path can form, at least in part, a wireless network. In an example of fiber optic and coaxial cable network, the first communication path can form at least part of a Data Over Cable Service Internet Specification (DOCSIS) network. In an aspect, one or more services can be provided over a wired and/or wireless network.

In step 504, a select service of the one or more services can be determined. In an aspect, the select service can be determined to be provided over a failover or redundant path, such as the communication path 306" (FIG. 3), to the destination. As an example, the failover path can form at least part of a wireless network. As a further example, the failover path can form at least part of a wireless mesh network. In an aspect, the select service can comprise an emergency service.

In step 506, failure (e.g., interrupt, denial of service, irregular operation, congestion, etc.) of the first communication path can be detected. In an aspect, network status and/or conditions can be monitored. As an example, failure of the first communication path can be detected by one or more path elements. As another example, failure of the first communication path can be detected by one or more failover elements.

In step 508, a particular failover path can be selected. In an aspect, the failover path can be selected from a plurality of communications paths to a particular destination. As an example, the failover path can be selected based on an optimal path of the plurality of communication paths to the destination. In an aspect, a failover element can analyze network traffic, capacity, service requirements, and/or network parameters to determine the failover path. In an aspect, access points (e.g., nodes 302a, 302b, 302c, 302d, 302e, 302f) configured in a mesh network can communicate with each other to exchange network and service information, Network information can comprise available bandwidth, signal strength, network latency, and the like. Service information can comprise allowed or available services (e.g., VoIP, home security system, network, e.g., Internet, connectivity, etc.). Based on one or more of the network information and the service information, the failover path can be selected for routing services when failover happens. As an example, one or more access points can use capacity matrix and exchange capacity information to determine an optimized and/or a preferred communication path. As a further example, one or more of network and service information can be analyzed to determine one or more services to be re-routed and the failover path via which the one or more services can be re-routed. Such analysis can be based upon weighted factors (e.g., network information, service information, class of service, etc.). Such analysis can be prioritize certain services such as emergency services.

In step 510, the select service can be routed over the failover path. In an aspect, the select service can be routed over the failover path in response to the failure of the first communication path. As an example, the select service can be routed over a wireless mesh network. However, other networks can be used.

Figure 6:
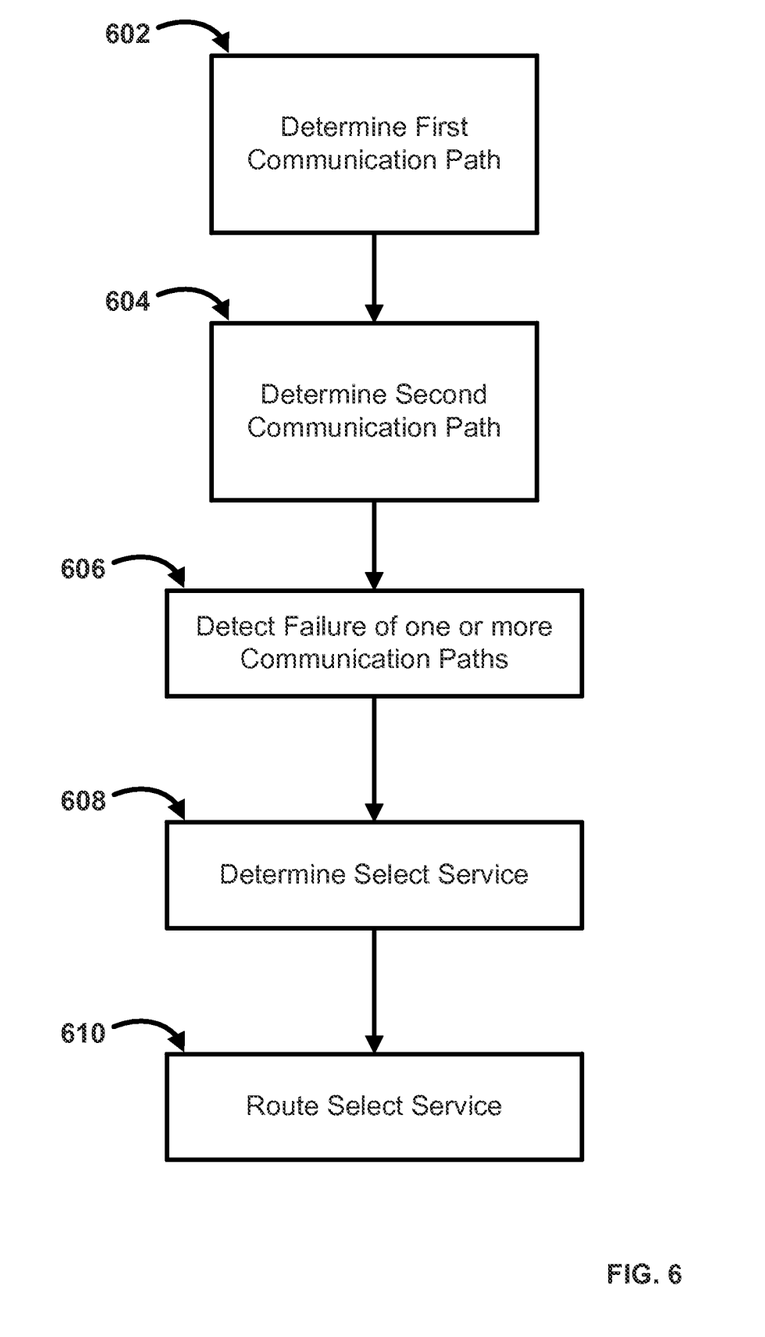
FIG. 6 is a flow chart of an exemplary method.

In an aspect, FIG. 6 illustrates an exemplary method for determining a service provider. The method illustrated in FIG. 6 will be discussed, for example only, in reference to FIGS. 1-4. In step 602, a first communication path, such as communication path 306' (FIG. 3), can be determined. In an aspect, the first communication path can provide a data pathway between a first node and a second node. As an example, one or more services can be provided over the first communication path. In an aspect, the first communication path can form at least part of a wireless network. In an example of fiber optic and coaxial cable network, the first communication path can form at least part of a DOCSIS network. In an aspect, one or more services can be provided over a wired and/or wireless network.

In step 604, a second communication path, such as communication path 306" (FIG. 3), can be determined. In an aspect, the second communication path can provide a data pathway between the first node and the second node. As an example, one or more services can be provided over the second communication path. As an example, the second communication path can form at least part of a wireless network. As a further example, the second communication path can form at least part of a wireless mesh network. In an aspect, the select service can comprise an emergency service.

In step 606, failure of the first communication path can be detected or determined. In an aspect, network status and/or conditions can be monitored. As an example, failure of the first communication path can be detected by one or more path elements, such as one of the path elements 308 (FIG. 3) As an example, failure of the first communication path can be detected by one or more failover elements.

In step 608, a select service of one or more services can be determined. In an aspect, the select service is determined to be provided over a failover or redundant path to the destination. As an example, the failover path can form at least part of a wireless network. As a further example, the failover path can form at least part of a wireless mesh network. In an aspect, the select service can comprise an emergency service. As an example, the service can be selected based on optimal path characteristics of one or more communication paths to the destination. In an aspect, a failover element, such as one of the failover elements 310 (FIG. 3), can analyze network traffic, capacity, service requirements, and/or network parameters to determine the select service.

In step 610, the select service can be routed over the failover path. In an aspect, the select service can be routed over the second communication path in response to the failure of the first communication path. As an example, the select service is routed over a wireless mesh network. However, other networks can be used. As a further example, routing via the failover path can be implemented on a service-by service basis.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. A method comprising:
   determining, by a first wireless access point of a plurality of wireless access points, a communication path from the first wireless access point to a computing device, wherein the first wireless access point is configured with a first service set identifier (SSID) to provide access to both a local area network (LAN) and the computing device and wherein the first wireless access point is configured with a second SSID to provide access to the computing device;
   exchanging, among the plurality of wireless access points, capacity data comprising:
      a respective capacity for each wireless access point of the plurality of wireless access points to provide a plurality of services, and
      a respective network capability for each wireless access point of the plurality of wireless access points;
   determining, by the first wireless access point based on the capacity data, a failover path comprising a second wireless access point of the plurality of wireless access points,
      wherein the second wireless access point is configured with the second SSID to provide access to the computing device;
   detecting, by the first wireless access point, a failure associated with the communication path;
   determining, by the first wireless access point, based on detecting the failure associated with the communication path, an emergency service of the plurality of services to provide over the failover path; and
   routing, by the first wireless access point based on detecting the failure associated with the communication path, the emergency service over the failover path.

2. The method of claim 1, wherein the communication path forms at least part of a Data Over Cable Service Internet Specification (DOCSIS) network.

3. The method of claim 1, wherein the failover path forms at least part of a wireless mesh network.

4. The method of claim 1, wherein the emergency service comprises at least one of a security service or a Voice over Internet Protocol (VoIP) call.

5. The method of claim 1, wherein the failover path is an optimal path in a mesh network.

6. The method of claim 1, wherein the second SSID is a hidden SSID.

7. The method of claim 1, wherein the first wireless access point provides a wide area network.

8. A method comprising:
   determining, by a first node, a first communication path of a plurality of communication paths between the first node and a computing device, wherein the first node is configured with a first service set identifier (SSID) to provide access to both a first local area network (LAN) and the computing device and wherein the first node is configured with a second SSID to provide access to the computing device;

receiving, by the first node, capacity data comprising:
    a respective capacity for each communication path of the plurality of communication paths to provide one or more services, and
    a respective network capability for each communication path of the plurality of communication paths;

determining, by the first node based on the capacity data, a second communication path of the plurality of communication paths, wherein the second communication path comprises a second node to connect to the computing device, wherein the second node is configured with the second SSID to provide access to the computing device;

detecting, by the first node, a failure associated with the first communication path;

determining, by the first node based on detecting the failure associated with the first communication path, an emergency service of the one or more services; and routing, by the first node based on detecting the failure associated with the first communication path, the emergency service over the second communication path.

9. The method of claim 8, wherein the first communication path forms at least part of a Data Over Cable Service Internet Specification (DOCSIS) network.

10. The method of claim 8, wherein the second communication path forms at least part of a wireless mesh network.

11. The method of claim 8, wherein the emergency service comprises at least one of a security service or a Voice over Internet Protocol (VoIP) call.

12. The method of claim 8, wherein the second communication path is an optimal path in a mesh network.

13. The method of claim 8, wherein the first node provides a wide area network.

14. A system comprising:
a plurality of nodes, wherein each node of the plurality of nodes is configured to exchange capacity data comprising:
    a respective capacity for each node of the plurality of nodes to provide one or more services, and
    a respective network capability for each node of the plurality of nodes;
a first communication path comprising a first node of the plurality of nodes, the first communication path configured to connect the first node to a computing device, wherein the first node is configured with a first service set identifier (SSID) to provide access to both a first local area network (LAN) and the computing device and configured with a second SSID to provide access to the computing device; and
a second communication path comprising a second node of the plurality of nodes, the second communication path configured to connect to the computing device, wherein the second node is configured with the second SSID to provide access to the computing device; and wherein at least one node of the plurality of nodes is further configured to:
    detect a failure associated with the first communication path,
    determine, based on detecting the failure associated with the first communication path, an emergency service of the one or more services to provide over the second communication path, and
    route the emergency service over the second communication path if the first communication path fails.

15. The system of claim 14, wherein the first communication path forms at least part of a Data Over Cable Service Internet Specification (DOCSIS) network.

16. The system of claim 14, wherein the second communication path forms at least part of a wireless mesh network.

17. The system of claim 14, wherein the second communication path is an optimal path in a mesh network.

18. An apparatus comprising:
one or more processors; and
a memory storing processor executable instructions that, when executed by the one or more processors, cause the apparatus to:
    determine a communication path from a first wireless access point of a plurality of wireless access points, to a computing device, wherein the first wireless access point is configured with a first service set identifier (SSID) to provide access to both a first local area network (LAN) and the computing device and configured with a second SSID to provide access to the computing device;
    exchange, with the plurality of wireless access points, capacity data comprising:
        a respective capacity for each wireless access point of the plurality of wireless access points to provide a plurality of services, and
        a respective network capability for each wireless access point of the plurality of wireless access points;
    determine, based on the capacity data, a failover path comprising a second wireless access point of the plurality of wireless access points, to connect to the computing device, wherein the second wireless access point is configured with the second SSID to provide access to the computing device;
    detect a failure associated with the communication path;
    determine, based on detecting the failure associated with the communication path, an emergency service of the plurality of services to provide over the failover path; and
    route, based on detecting the failure associated with the communication path, the emergency service over the failover path.

19. The apparatus of claim 18, wherein the apparatus comprises the first wireless access point of the plurality of wireless access points.

20. The apparatus of claim 18, wherein the apparatus is further configured to provide access to a wide area network.

* * * * *